Patented Oct. 24, 1933

1,931,821

UNITED STATES PATENT OFFICE 1,931,821

DYESTUFF OF THE ANTHANTHRONE SERIES

Rudolf Heidenreich, Leverkusen-on-the-Rhine, Germany, assignor to General Aniline Works, Inc., New York, N. Y., a corporation of Delaware No Drawing. Application March 30, 1928, Serial No. 266,099, and in Germany April 9, 1927

8 Claims. (Cl. 260—46)

The present invention relates to new dye-stuffs of the anthanthrone series and to a process of preparing same.

I have found that when reacting with ring closing agents upon the compounds obtainable by condensing halogenated anthanthrones or derivatives thereof with aminoanthraquinones or derivatives thereof which compounds probably are anthanthrone-anthrimides, new worthful vat dyestuffs are obtainable which dye cotton strong shades of various tints and of excellent fastness.

Both acidic and alkaline ring closing agents may be used, for instance: concentrated sulfuric acid, chlorosulfonic acid, a mixture of anhydrous aluminium chloride and sodium chloride, a mixture of potassium hydroxide and alcohol and the like. In the case that sulfuric acid is used as ring closing agent it is of advantage to subject the resulting products to the action of an oxidizing agent. The temperature at which reaction takes place varies within wide limits depending from the kind of the ring closing agent used. Thus, when working with acid ring closing agents such as concentrated sulfuric acid or chlorosulfonic acid, a temperature of about 15 to 45° C. may be of advantage while when working with a mixture of potassium hydroxide and methyl alcohol temperature of 200–250° C. are useful.

With the knowledge at present at our disposal we presume that new intramolecular ring formation takes place with the probable formation of carbazole derivatives in the case of acid ring closing agents, whereas pyridine ring formation probably will occur in the case of using an alkaline ring closing agent.

The products thus obtainable form dark powders difficultly soluble in the usual organic solvents soluble in strong sulfuric acid with brown to green colorations dyeing cotton from the hydrosulfite vat khaki-brown to grey shades of good fastness.

The following examples illustrate my invention without limiting it thereto, the parts being by weight:

*Example 1.*—10 parts of the anthanthrone-anthrimide of the probable formula:

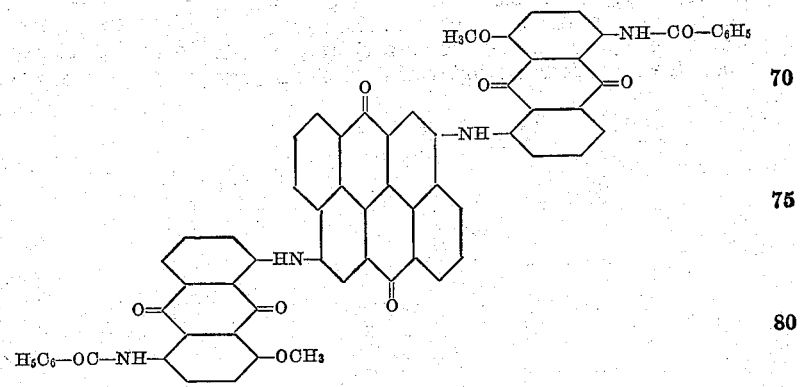

are dissolved in 100 parts of concentrated sulfuric acid at ordinary temperature. Soon the coloration of the solution changes from blueish green to dull olive. By stirring it into water, to which a little sodium nitrite, chromic acid, or an other oxidizing agent has been added, a dyestuff separates, which dyes cotton from the vat, dark violet brown shades. The product probably corresponds to the formula:

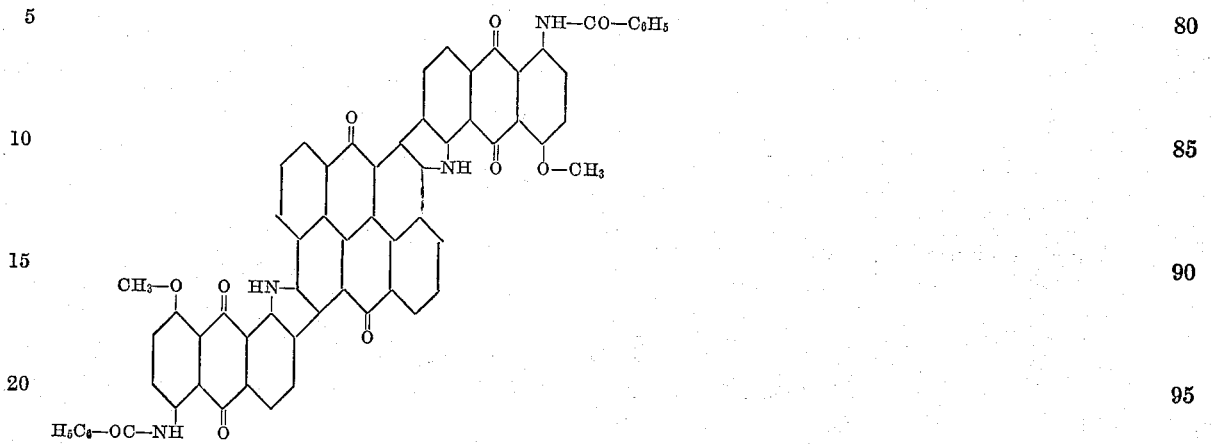

*Example 2.*—10 parts of the anthanthrone-anthrimide of the probable formula:

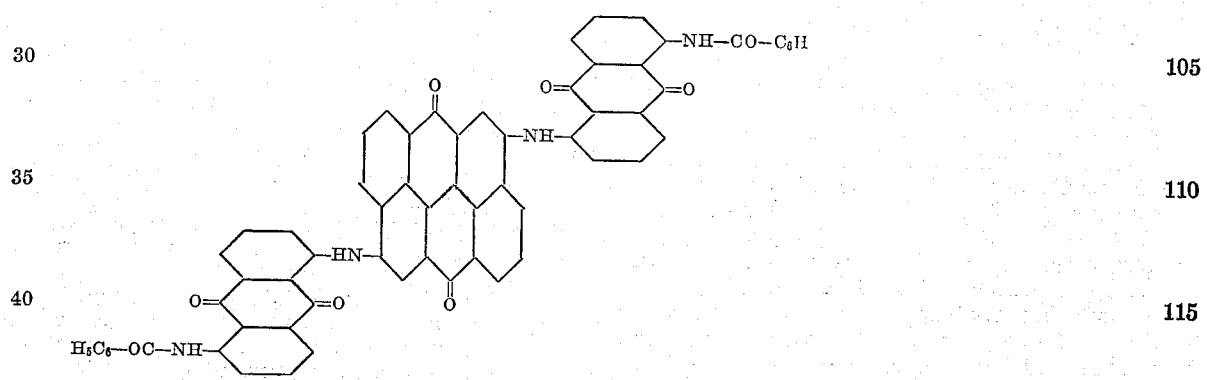

are introduced into 100 parts of chlorosulfonic acid, whereupon the temperature rises spontaneously to about 30° C. The mixture is now either left to stand for some time at room temperature or heated to about 35–45° C. The reaction is complete, when the solution has acquired a deep blue coloration. Test portions in concentrated sulfuric acid change from yellowish brown through a dirty green to a clear greenish blue. Test portions in water change from grey to khaki. When working up the melt in the customary manner for example, by pouring the melt, after dilution with strong sulfuric acid, into ice water, filtering and washing with water until neutral a dyestuff is obtained which dyes cotton from a wine red vat a particularly fast powerful khaki shade in contradistinction to the grey dyeing of the starting material. The product probably corresponds to the formula:

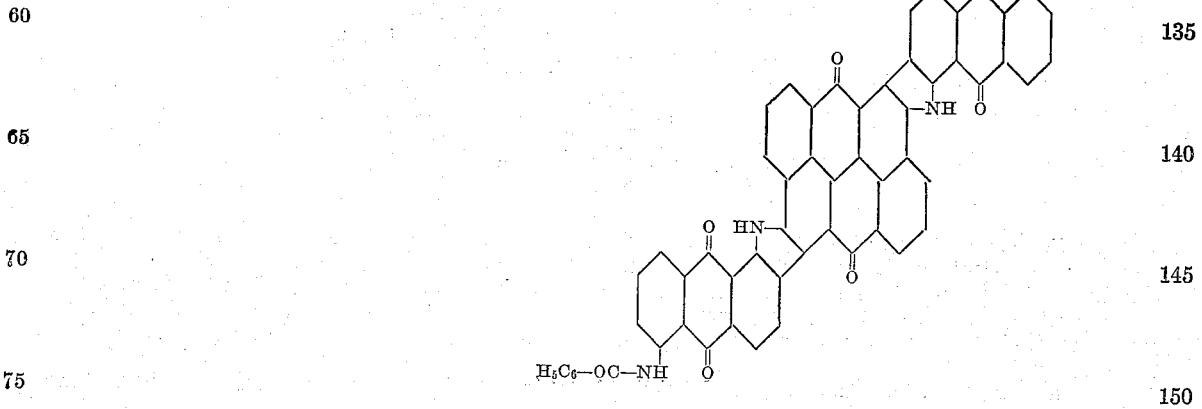

When using as starting material the anthathrone anthrimide of the probable formula:

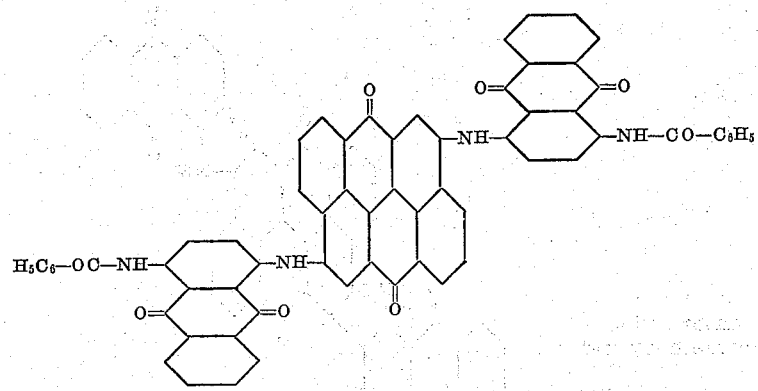

a product is obtained which forms a dark powder difficultly soluble in the usual organic solvents soluble in strong sulfuric acid with a dull green coloration and which dyes cotton from the hydrosulfite vat strong greyish blue shades of good fastness.

It probably corresponds to the formula:

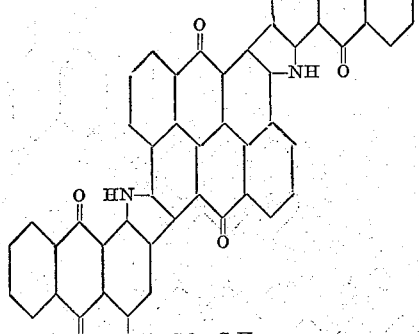

*Example 3.*—Four parts of anhydrous aluminium chloride are mixed with one part of sodium chloride and melted for about 2 hours at about 190–210° C. with one part of the anthathrone-anthrimide of the probable formula:

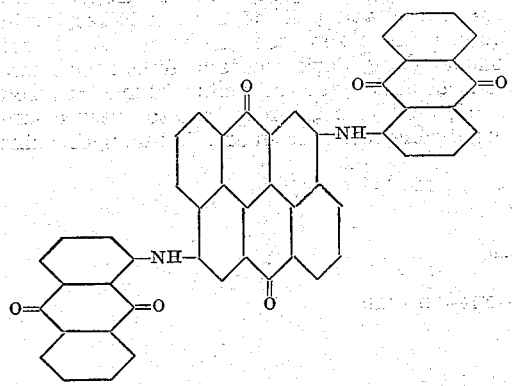

On working up in the customary manner a dark powder is obtained which gives a dirty olive solution in concentrated sulfuric acid, and dyes cotton beautiful slate grey shades of very satisfactory fastness properties.

The same dyestuff is obtained when employing instead of the aluminium chloride sodium chloride mixture a mixture of aluminium chloride and anhydrous pyridine. The dyestuffs probably have the structural formula:

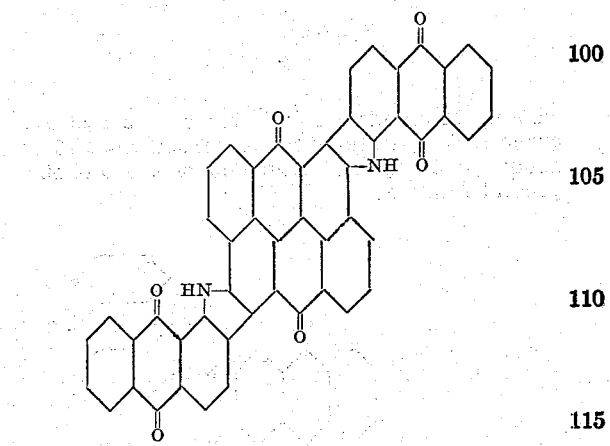

Similar dyestuffs are obtainable when starting from anthanthrone-anthrimides obtained by condensing halogen-anthanthrones containing one, three or more halogen atoms with aminoanthraquinones.

I claim:
1. The process which comprises reacting upon an anthanthrone-dianthrimide with an acidic ring closing agent at a temperature between about 15 and about 250° C.
2. The process, which comprises reacting upon an anthanthrone-dianthrimide with a compound of the formula:

wherein X stands for chlorine or the hydroxy group at temperatures ranging from about 15 to about 45° C.

3. The process, which comprises reacting with a compound of the formula:

wherein X stands for chlorine or the hydroxy group at temperatures ranging from about 15 to about 45° C. upon an anthanthrone-anthrimide of the probable general formula:

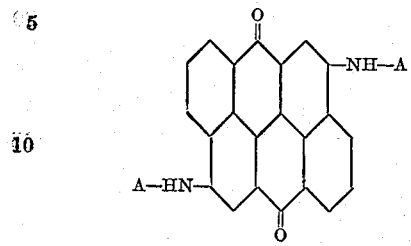

wherein the two A's stand for anthraquinone nuclei which may be substituted by methoxy and benzoyl-amine groups.

4. The process, which comprises reacting with a compound of the formula:

wherein X stands for chlorine or the hydroxy group at temperatures ranging from about 15 to about 45° C. upon a compound of the probable general formula:

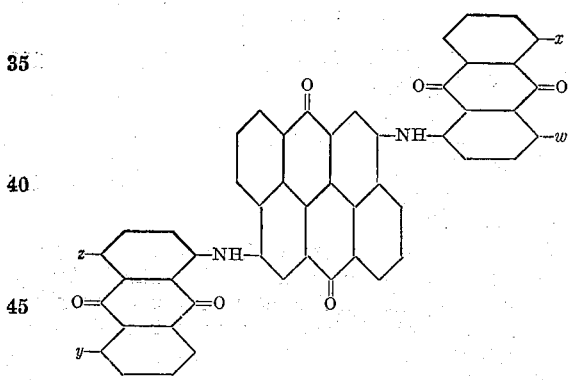

wherein in case $w$ and $z$ stand for the benzoylamino group, $x$ and $y$ represent hydrogen atoms or in case $x$ and $y$ stand for the benzoylamino group, $w$ and $z$ represent hydrogen atoms.

5. The process, which comprises reacting with chlorosulfonic acid at a temperature of between about 35 and about 45° C. upon the compound of the probable formula:

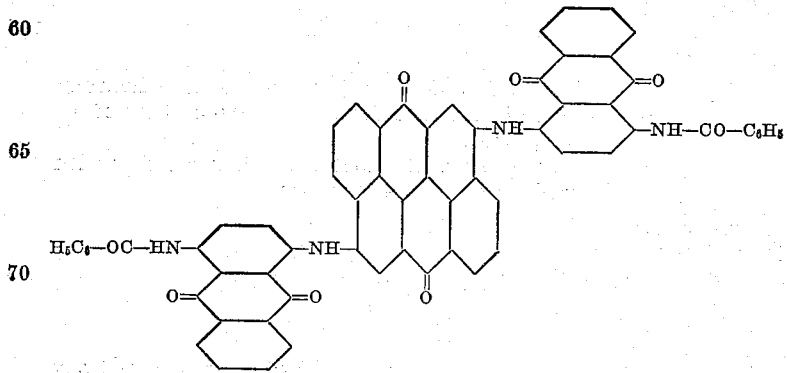

6. The products of the probable general formula:

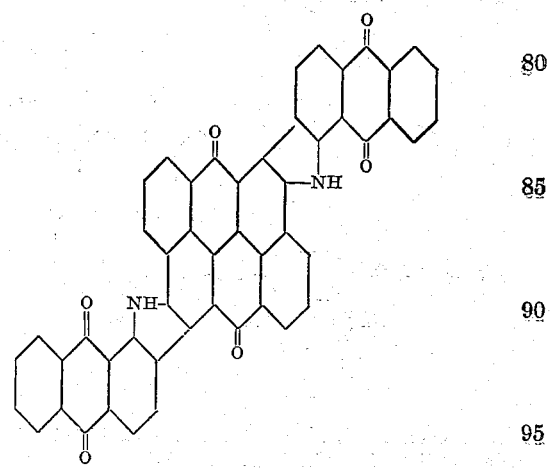

wherein the anthraquinone nuclei may be substituted by methoxy and benzoylamino groups, being dark powders, difficulty soluble in the usual organic solvents, soluble in strong sulfuric acid with brown over blue to green colorations, dyeing cotton from an alkaline hydrosulfite vat khaki brown to grey shades of good fastness.

7. The products of the probable general formula:

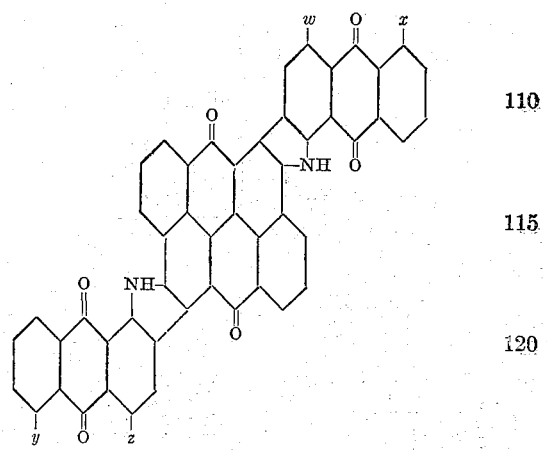

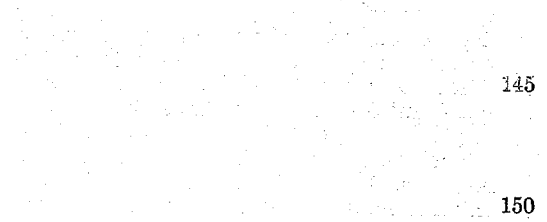

wherein in case $w$ and $z$ stand for the benzoylamino group, $x$ and $y$ represent hydrogen atoms or in case $x$ and $y$ stand for the benzoylamino group $w$ and $z$ represent hydrogen atoms, said products being dark powders, difficultly soluble in the usual organic solvents, soluble in strong sulfuric acid with greenish blue to green colorations, dyeing cotton from an alkaline hydrosulfite vat strong greyish blue to khaki shades of good fastness.

8. The products of the probable general formula:

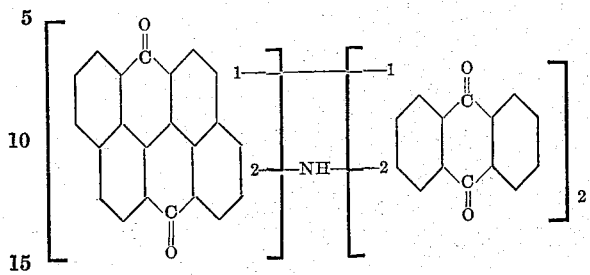

wherein the linkages 1—1 and 2—2 are attached in ortho-positions to the anthanthrone and anthraquinone nuclei, and wherein the anthraquinone nuclei may be substituted by methoxy and benzoyl-amino groups, said products being dark powders difficultly soluble in the usual organic solvents, soluble in strong sulfuric acid with brown to green colorations, dyeing cotton from an alkaline hydrosulfite vat khaki brown to grey shades of good fastness properties.

RUDOLF HEIDENREICH.